United States Patent [19]

Edenbaum et al.

[11] Patent Number: 4,675,232
[45] Date of Patent: Jun. 23, 1987

[54] SELF-RELEASE FOAM LAMINATE

[75] Inventors: Martin I. Edenbaum, Princeton Junction, N.J.; Borys Rybalka, Philadelphia, Pa.

[73] Assignee: Seton Company, Newark, N.J.

[21] Appl. No.: 864,483

[22] Filed: May 19, 1986

[51] Int. Cl.$^4$ .................. B32B 7/04; B32B 27/40; B05D 3/02
[52] U.S. Cl. .................. 428/317.3; 427/373; 428/343; 428/355; 428/906
[58] Field of Search ............. 428/317.1, 317.3, 317.7, 428/343, 355, 906; 427/373

[56] References Cited

U.S. PATENT DOCUMENTS

| | | | |
|---|---|---|---|
| 2,968,575 | 1/1961 | Mallonee | 106/287.2 |
| 3,412,054 | 11/1968 | Milligan et al. | 524/591 |
| 3,461,103 | 8/1969 | Keberle et al. | 521/65 |
| 3,479,310 | 11/1969 | Dieterich et al. | 521/65 |
| 3,973,563 | 8/1976 | Green et al. | 428/343 |
| 3,989,869 | 11/1976 | Neumaier et al. | 428/254 |
| 4,024,088 | 5/1977 | Godlewski | 521/168 |
| 4,029,534 | 6/1977 | Bocks et al. | 156/246 |
| 4,046,729 | 9/1977 | Scriven et al. | 524/589 |
| 4,066,591 | 1/1978 | Scriven et al. | 524/840 |
| 4,169,184 | 9/1979 | Pufahl | 428/317.3 |
| 4,171,391 | 10/1979 | Parker | 427/246 |
| 4,484,574 | 11/1984 | DeRusha et al. | 128/156 |

FOREIGN PATENT DOCUMENTS 1076688 12/1965 United Kingdom .

Primary Examiner—William J. Van Balen
Attorney, Agent, or Firm—Webb, Burden, Robinson & Webb

[57] ABSTRACT

A method of mechanically frothing and casting an aqueous polyurethane dispersion yields a foam which, when rolled, wound or stacked, is self-releasing from the pressure sensitive adhesive layer co-cured therewith. The method includes admixing an aqueous ionic polyurethane dispersion with a stearate stabilizer and an optional aziridine crosslinking agent, frothing and casing the admixture, and co-curing the resultant foam sheet with a pressure sensitive adhesive layer. Before frothing, the polyurethane dispersion contains particles having an average size of less than one micron, and contains between 35 and 70 percent by weight of the polyurethane dispersion, between 13 and 50 percent by weight of a 33 percent by weight dispersion of a stearate salt, and up to 33 percent by weight of polyfunctional aziridine. The foam produced from the frothed admixture provides a substrate with which an uncured pressure sensitive adhesive can firmly co-cure but to which the cured adhesive demonstrates readily removable adhesion. The laminate of the foam with a pressure sensitive adhesive thus provides either a medical dressing, or a general purpose tape for industrial use, which may be stacked or self-wound without release paper.

17 Claims, No Drawings

SELF-RELEASE FOAM LAMINATE

FIELD OF THE INVENTION

The present invention relates to polyurethane foam sheet which, when laminated with a pressure sensitive adhesive layer, are self-releasing, i.e., may be wound or stacked without interleaved release liner.

INTRODUCTION

The broad generic appellation "polyurethane foam" applies to a large and varied genus of foamed elastomers. Those skilled in the polyurethane foam arts are aware, however, that the polyurethane foams, and the various physical and chemical polyurethanes generally, differ markedly from each other because the sole common denominator among the varied compositions is the presence of a relatively few urethane linkages. The various polyurethane compositions and foams, as a result, frequently are not interchangeable for any given specialty application.

A number of methods are known for making flexible polyurethane foams, and are specifically used for making flexible foam sheets. In general, such foams have been formed from both polyurethane solvent systems and aqueous polyurethane dispersions, and have been frothed into foams both by the physical agitation of, and by the chemical generation of carbon dioxide within, the polyurethane starting material. Despite the various methods by which such flexible foam sheets have been prepared, no method to date has emerged as satisfactory for forming self-release foam laminates, i.e., foam sheets having layers of pressure sensitive adhesive thereon, which may be self-wound or stacked without release liner.

DESCRIPTION OF THE PRIOR ART

A number of polyurethane foams have been produced from aqueous polyurethane latices or dispersions. For example, U.S. Pat. Nos. 3,461,103 and 3,479,310, along with Great Britain Pat. No. 1,076,688, disclose churning emulsifier-free ionic polyurethane dispersion into foamed plastics. U.S. Pat. No. 3,989,869 to Neumaier et al. discloses frothing an emulsifier-free nonionic aqueous polyurethane dispersion and casting and drying the froth into a foam. The Neumaier et al. method employs polyurethane dispersions which have particles less than 1 micron in diameter, solids contents of more than 45 percent be weight and dispersion viscosities in the 200 to 1200 centipoise range, measured prior to the addition of about 0.1 to about 10 percent by weight of a thickening agent. Neumaier et al. do not disclose the viscosity of the dispersion after the addition of a thickener, but explain that the method is an improvement over their own prior method in which ionomeric polyurethane dispersions were foamed without thickener and with the addition of foaming agents, stabilizers and crosslinking compounds.

The prior method cited in Neumaier et al. is the subject matter of U.S. Pat. No. 4,029,534 to Bocks et al., which teaches the preparation of foams from certain polyurethane dispersions which have specific macroscopic properties. More particularly, the dispersions taught as suitable for use by Bocks et al. (1) must have a solids content between 45 and 62 percent by weight; (2) must have a relatively low viscosity such as 200 to 1200 centipoise; (3) must have particles of a diameter between 0.05 and 1.0 micron, preferably between 0.07 and 0.30 microns; (4) must have a solubilizing ionic group present in an amount between 2 and 40 milliequivalents per 100 grams of polyurethane solids; and (5) must yield a homogeneous foil (cast without foaming) having a tensile strength of a least 40 kg/cm$^2$.

Unfortunately, none of the formulations and processes described in the prior art yields a foam sheet suitable for laminating with a layer of pressure sensitive adhesive to yield a self-releasing product. More specifically, none of the foams provides a suitable substrate, for co-curing with a pressure sensitive adhesive, wherein the cured foam surface and the cured pressure sensitive adhesive demonstrate readily-removable yet firm adhesion upon contact. A need remains for such a polyurethane foam composition.

BRIEF DESCRIPTION OF THE INVENTION

In order to meet this need, the present invention is a method of mechanically frothing and casting an aqueous plyurethane dispersion to yield a foam which, when rolled or stacked, is self-releasing from the pressure sensitive adhesive layer co-cured therewith. The method includes admixing an aqueous anionic polyurethane dispersion with a stearate stabilizer and optional aziridine crosslinking agent, frothing and casting the admixture, and co-curing the resultant foam sheet with a pressure sensitive adhesive layer. Before frothing, the polyurethane dispersion contains particles having an average size of less than one micron, and contains between 35 and 70 percent by weight dispersed polyurethane solids. The admixture, prior to frothing, contains between 33 and 87 percent by weight of the polyurethane dispersion, between 13 and 50 percent by weight of a 33 percent by weight dispersion of a stearate salt, and up to 33 percent by weight of a polyfunctional aziridine crosslinking agent. The foam produced from the frothed admixture provides a substrate with which an uncured pressure sensitive adhesive can firmly co-cure but to which the cured adhesive demonstrates readily removable adhesion. The laminate of the foam with a pressure sensitive adhesive thus provides either a medical dressing, or a general purpose tape for industrial use, which may be stacked or self-wound without release paper.

DETAILED DESCRIPTION OF THE INVENTION

Preparation of Aqueous Ionic Polyurethane Dispersions

The polyurethane useful in the practice of the present invention are those recognized in the art as ionically water dispersible. These dispersions are in contrast with the emulsified isocyanate copolymers such as those disclosed in U.S. Pat. No. 2,968,575 and prepared and dispersed in water with the aid of detergents under the action of powerful shearing forces. The emulsified polyurethanes have the disadvantage that a detergent must be used to form the emulsion and such detergent is usually retained in the cured polyurethane, thus seriously detracting from the overall physical and chemical properties of the final product.

The preferred system for preparing aqueous ionic polyurethane dispersions is to prepare polymers that have free acid groups, preferably carboxylic acid groups, covalently bonded to the polymer backbone. Neutralization of these carboxyl groups with an amine, preferably a water soluble mono-amine, affords water dilutability. Careful selection of the compound bearing the carboxylic group must be made because isocyanates, the reactive group employed most often in the generation of urethane linkages, are generally reactive with carboxylic groups. However, as disclosed in U.S. Pat. No. 3,412,054, incorporated herein by reference, 2,2-hydroxymethyl-substituted carboxylic acids can be reacted with organic polyisocyanates without significant reaction between the acid and isocyanate groups as a result of the steric hindrance of the carboxyl by the adjacent alkyl groups. This approach provides the desired carboxyl-containing polymer with the carboxylic groups being neutralized with the tertiary mono-amine to provide an internal quaternary ammonium salt and, hence, water dilutability.

Suitable carboxylic acids and, preferably, the sterically hindered carboxylic acids, are well-known and readily available. For example, they may be prepared from an aldehyde that contains at least two hydrogens in the alpha position which are reacted in the presence of a base with two equivalents of formaldehyde to form a 2,2-hydroxymethyl aldehyde. The aldehyde is then oxidized to the acid by procedures known to those skilled in the art. Such acids are represented by the structural formula:

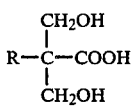

wherein R represents hydrogen, or alkyl of up to 20 carbon atoms, and preferably, up to 8 carbon atoms. A preferred acid is 2,2-di(hydroxymethyl) propionic acid.

The polymers with the pendant carboxyl groups are characterized as anionic polyurethane polymers. Further in accordance with the present invention, however, an alternate route to confer water dilutability is to use a cationic polyurethane having pendant amino groups. Such cationic polyurethanes are disclosed in U.S. Pat. No. 4,066,591, incorporated herein by reference, and particularly as set forth in Example XVIII. In the context of the present invention, however, anionic polyurethane dispersions are preferred.

The polyurethanes useful in the practice of the invention more particularly involve the reaction of di- or polyisocyanates and compounds with multiple reactive hydrogens suitable for the preparation of polyurethanes. Such diisocyanates and reactive hydrogen compounds are more fully disclosed in U.S. Pat. Nos. 3,412,054 and 4,046,729. Further, the processes to prepare such polyurethanes are well recognized as exemplified by the aforementioned patents. In accordance with the present invention, therefore, aromatic, aliphatic and cycloaliphatic diisocyanates or mixtures thereof can be used in forming the polymer. Such diisocyanates, for example, are tolylene-2,4-diisocyanate; tolylene-2,6-diisocyanate; meta-phenylene diisocyanate; biphenylene-4,4'-diisocyanate; methylene-bis-(4-phenol isocyanate); 4,4-chloro-1,3-phenylene diisocyanate; naphthylene-1,5-diisocyanate; tetramethylene-1,4-diisocyanate; hexamethylene-1,6-diisocyanate; decamethylene-1,10-diisocyanate; cyclohexylene-1,4-diisocyanate; methylene-bis(4-cyclohexyl isocyanate); tetrahydronaphthylene diisocyanate; isophorone diisocyanate and the like. Preferably, the arylene and cycloaliphatic diisocyanates are used in the practice of the invention.

Characteristically, the arylene diisocyanate encompasses those in which the isocyanate group is attached to the aromatic ring. The most preferred isocyanates are the 2,4 and 2,6 isomers of tolylene diisocyanate and mixtures thereof, due to their reactivity and ready availability. The cycloaliphatic diisocyanates used most advantageously in the practice of the present invention are 4,4'-methylene-bis(cyclohexyl isocyanate) and isophorone diisocyanate.

Selection of the aromatic or aliphatic diisocyanates is predicated upon the final end use of the particular material. As is well recognized by those skilled in the art, the aromatic isocyanates may be used where the final product is not excessively exposed to ultraviolet radiation, which tends to yellow such polymeric compositions. The aliphatic diisocyanates, on the other hand, may be more advantageously used in exterior applications and may have less tendency to yellow upon exposure to ultraviolet radiation. Although these principles form a general basis for the selection of the particular isocyanate to be used, the aromatic diisocyanates may be further stabilized by well known ultraviolet stabilizers to enhance the final properties of the polyurethane product. In addition, antioxidants may be added in art recognized levels to improve the characteristics of the final dispersions. Typical antioxidants are the thioethers and phenolic antioxidants such as 4,4'-butylidine-bis-meta cresol and 2,6-ditert-butyl-para-cresol.

The isocyanate is reacted with the multiple reactive hydrogen compounds such as diols, diamines or triols. In the case of diols or triols, they are typically either polyalkylene ether or polyester polyols. A polyalkylene ether polyol is the preferred active hydrogen containing polymeric material for formulation of the polyurethane. The most useful polyglycols have a molecular weight of 50 to 10,000 and, in the context of the present invention, the most preferred is from about 400 to about 7,000 with the higher molecular weight polyols conferring proportionately greater flexibility upon the polymer. The desired elastomeric behavior will generally require approximately 0.5–80 percent by weight of a long chain polyol (i.e., 700 to 2,000 eq. wt.) in the polymer.

Examples of the polyether polyols are, but not limited to, polyethylene ether glycol, polypropylene ether glycol, polytetramethylene ether glycol, polyhexamethylene ether glycol, polyoctamethylene ether glycol polydecamethylene ether glycol, polydodecamethylene ether glycol, and mixtures thereof. Polyglycols containing several different radicals in the molecular chain, such as, for example, the compound $HO(CH_2OC_2H_4O)_nH$ wherein n is an integer greater than 1, can also be used.

The polyol may also be a hydroxy terminated or hydroxy pendant polyester which can be used instead of or in combination with the polyalkylene ether glycols. Exemplary of such polyesters are those formed by reacted acids, esters or acid halides with glycols. Suitable glycols are polymethylene glycols, such as ethylene, propylene, tetramethylene or decamethylene glycol; substituted methylene glycols such as 2,2-dimethyl-1,3-propane diol, cyclic glycols such as cyclohexane diol and aromatic glycols. Aliphatic glycols are generally prefered when flexibility is desired. These glycols are reacted with aliphatic cycloaliphatic or aromatic dicarboxylic acids or lower alkyl esters for ester-forming derivatives to produce relatively low molecular weight polymers, preferably having a melting point of less than about 70° C. and a molecular weight comparable to those set forth above for the polyalkylene ether glycols. Acids suitable for use in preparing such polyesters are, for example, phthalic, maleic, succinic, adipic, suberic, sebacic, terephthalic and hexahydrophthalic acids and the alkyl and halogen substituted derivatives of these acids. In addition, a polycaprolactone terminated with hydroxyl groups may also be used.

When used herein, "ionic dispering agent" means an ionizeable acid or base capable of forming a salt with the solubilizing agent. These "ionic dispersing agents" are amines and preferably are water soluble amines such as triethylamine, tripropylamine, N-ethyl piperidine, and the like; also, acid and preferably water soluble acids such as acetic, propionic, lactic, and the like. Naturally, an acid or amine will be selected contingent on the solubilizing group pendant on the polymer chain.

In forming the polyurethanes useful in the practice of the invention, the polyol and the diisocyanate (or polyisocyanate) are reacted to form dispersible prepolymer or polymer. Although suitable reaction conditions and reaction times and temperatures are variable depending on the particular isocyanate and polyol utilized, those skilled in the art well recognize the variations. Such skilled artisans recognize that reactivity of the ingredients involved requires the balance of reaction rate with undesirable secondary reactions leading to color and molecular weight degradation. Typically, the reaction is carried out with stirring at about 50° to about 100° C. for about 1 to 4 hours. To provide pendant carboxyl groups, the isocyanate terminated polymer is reacted with a molar deficiency of dihydroxy acid for 1 to 4 hours at 50° C. to 120° C. The acid is desirably added as a solution, for example, in N-methyl-1,2-pyrrolidone or N-N-dimethylformamide. The solvent for the acid will typically be no more than about 5 percent of the total charge in order to minimize the organic solvent concentration in the polyurethane composition. After the dihydroxy acid is reacted into the polymer chain, the pendant carboxyl groups are neutralized with an amine at about 58°–79° C. for about 20 minutes, and is accomplished by addition to water with stirring.

The dispersion viscosity is generally in the range of from 10 to 1000 centipoise. Useful solutions of polyurethane in organic solvents, by contrast, generally have viscosities of several thousand centipoise, ranging as high as 50,000 centipoise when the solution contains about 20 to 30 percent by weight polyurethane. Suitable polyurethane dispersions contain, moreover, about 50 to 70 percent by weight polyurethane solids in dispersion. The preferred polyurethane concentration is 55 to 65 percent by weight and the most preferred concentration is 60 percent by weight polyurethane solids in dispersion.

Particle size, as a useful measure of stability, may be measured by light scattering. Useful dispersion having non-setting characteristics will have particles of a diameter of less than one micron. Additional suitable polyurethane compositions are recited in U.S. Pat. No. 4,171,391, incorporated herein by reference.

FROTHING METHOD

In order to froth the aqueous ionic polyurethane dispersions to create the self-release laminate of the present invention, the dispersions are first admixed with a stearic acid salt and an optional aziridine crosslinking agent. The salt of stearic acid may be selected from the group consisting of aluminum stearate, ammonium stearate, calcium stearate, potassium stearate and sodium stearate. The optional aziridine crosslinking agent may be any known aziridine crosslinking agent wherein the agent has monofunctional or polyfunctional aziridine activity due to the incorporation therein of ethyleneimine, propyleneimine, butyleneimine or derivatives thereof. Preferably, the aziridine selected is the polyfunctional aziridine preparation of proprietary formula, sold under the trademark XAMA ®-7, which contains 6.35 to 6.95 meq/g aziridine content and has an aziridine functionality of approximately 3.3. The XAMA ®-7 polyfunctional aziridine has a viscosity of 1200 to 2000 centipoise at 25° C., further has a density of 1.185 g/cc at 25° C., and is completely miscible with water, acetone, methanol, chloroform and benzene.

The admixture is prepared by combining between 33 and 87 percent by weight of an aqueous ionic polyurethane dispersion, prepared as described above, with up to 33 percent by weight of XAMA ®-7 polyfunctional aziridine and between 13 and 50 percent by weight of a 33 percent aqueous or nonaqueous dispersion of the stearate salt. Different amounts and concentrations of stearate and aziridine preparations may be substituted in reactive equivalent amounts.

On a laboratory scale, the dispersion, stearate and optional aziridine may be admixed in a Hobart mixer; an Oaks or other industrial frothing mixer is suitable for full scale production. After initial admixing of the polyurethane dispersion, the stearate and the optional aziridine, in order to combine the components thoroughly, the mixture is frothed at high speed, by agitation and/or inert gas injection, for 10 to 30 minutes. A froth results which has very fine, uniform bubbles and which is suitable for immediately casting and curing. Although the froth may be cast by other means, the froth is particularly suited to the knife-over-roll casting technique for preparing foam sheet materials. Preferably, therefore, the liquid froth is cast upon a release surface, such as silicone coated release paper, and coated to the desired thickness with, for example, a Gardner knife. The release paper/frothed layer is then passed through an oven to dry and cure the foam. Temperatures above 100° C. and below about 170° C. can then be used to initiate aziridine reaction and/or thoroughly dry the foam sheet.

LAMINATING METHOD

The foams produced in accordance with the present application provide substrates for the ready adherence of pressure sensitive adhesives co-cured therewith yet also demonstrate readily-removable yet firm adhesion to the surfaces of already-cured pressue sensitive adhesives. A number of pressure sensitive adhesive compositions are suitable for use in association with these foams. Among these are the acrylic adhesive resins, in addition to blends of butadiene-acrylonitrile copolymers with resins such as oil-soluble, heat-hardening phenol-formaldehyde resins, two-step thermosetting phenolic resin compositions, coumarone-indene resins, polyterpene resins and the like; polychloroprene combined with heat-hardening phenol-formaldehyde resins; rosin-phenol resins, vinyl alkyl ether polymer based adhesives, thermoplastic styrene-butadiene block polymer rubbers mixed with resins such as those described, and other such adhesive compositions. Preferably, the adhesive composition will be noncytotoxic in its cured form, to enable the preparation of laminates which have optimal medical/surgical utility.

Particularly useful pressure sensitive adhesive film-forming compositions include the acrylic solution adhesive AS-351-HVX, available from Avery International. This preparation is a crosslinkable polymer which cures to yield a tacky pressure sensitive adhesive film. The preparation is particularly well suited for lamination with the foams described above because, for example, they cure without additional tackifying agent to films which have excellent resistance to delamination under wet conditions. In addition, cured products prepared from this adhesive preparation do not lose tack upon application of sterilizing heat; medical products containing these adhesives may therefore be autoclaved without adhesive deterioration. For these reasons, although other adhesive compositions are suitable for use in the present invention, the Avery AS-351-HVX adhesive composition is preferred.

Within the scope of the present invention, the foam sheet and the adhesive layer may be laminated by virtually any method *except* the mere low-pressure contacting of the cured pressure sensitive adhesive film with the cured foam. For example, the uncured adhesive composition may be cast onto the already cured foam layer with the subsequent co-curing of the laminate. Similarly, the uncured adhesive composition may be cast onto a release layer, after which the foam may be placed on top of the uncured adhesive before the foam and adhesive are co-cured to form the laminate. Alternatively, the foamed stearate containing polyurethane dispersion may be cast onto a cured adhesive film, or the uncured foam and uncured adhesive may be coextruded and cured, or otherwise co-cured. Finally, the cured foam and cured adhesive layers may be laminated under heat and/or pressure as long as the adhesion between the actual layers of the laminate is significantly greater than the adhesion which results between the cured foam and the cured adhesive under the ordinary conditions of rolling, stacking, packaging or storing. All of these methods may be appropriately designated as "co-curing" techniques, thus excluding mere low pressure contact. The co-curing of laminates which incorporate the Avery AS-351-HVX is preferably carried out by subjecting the combined cured foam and uncured adhesive laminate to 225°–250° F. heat for two or three minutes.

The relative thicknesses of the layers of the laminates thus produced may vary widely and will ordinarily be dictated by the requirements of each individual application. Preferred thicknesses for foams and adhesives in medical/surgical products, in particular, are well known in the art.

The invention will be further illustrated by the following Example.

EXAMPLE I

One hundred parts by weight of Witcobond ® W-290H aqueous polyurethane dispersion, containing 62 percent by weight polyurethane solids are admixed, at slow speed in a Hobart mixer, with 15.0 parts by weight of 33 percent aqueous ammonium stearate and 2.0 parts by weight XAMA ®-7 polyfunctional aziridine. The admixture is then frothed in the Hobart mixer 1 minute at low speed, 2 minutes at medium speed, 1 minute at high speed, and is then coated at 0.170" gap onto a silicone resin coated release liner. The cast foam is cured and dried by a 13 minute application of heat in a 250° F. oven. The resulting foam layer in porous, resilient and velvety to the touch.

Forty parts by weight of Avery International Acrylic Solution Adhesive AS-351-AVX were cast, at 0.080" gap, onto a fresh silicone resin coated release liner. Within 10 seconds, a layer of the foam produced according to the above is laid atop the uncured adhesive composition, and the two layers together are passed through a 250° F. oven for a total heating time of three minutes. The laminate is allowed to dry completely, is cut into strips and self-wound, and is packaged and sterilized for sale and use in medical/surgical applications.

The rolled laminate thus produced is easily unwound for use, yet with no suggestion of failure of adhesion between the foam and adhesive layers of the laminate itself.

Having described presently preferred embodiments of the invention, it is to be understood that they may be otherwise embodied within the scope of the appended claims.

We claim:

1. A self-release laminate comprising a stearate containing polyurethane foam having a layer of pressure sensitive adhesive co-cured therewith, wherein said stearate containing polyurethane foam is a foamed and cured stearate-salt-containing aqueous polyurethane dispersion.

2. The self-release laminate of claim 1 wherein said stearate containing polyurethane foam is a foamed and cured stearate-salt-containing aqueous polyurethane dispersion.

3. The self-release laminate of claim 2 wherein said stearate salt is selected from the group consisting of aluminum stearate, ammonium stearate, calcium stearate, potassium stearate and sodium stearate.

4. The self-release laminate of claim 2 wherein said aqueous polyurethane dispersion is a dispersion of ionically solubilized polyurethane.

5. The self-release laminate of claim 1 wherein said stearate containing polyurethane foam incorporates a polyfunctional aziridine crosslinking agent.

6. The self-release laminate of claim 5 wherein said stearate containing polyurethane foam incorporates between about 5 and 10 percent by weight stearate salt.

7. A method for preparing a self-release laminate, comprising:
   (a) selecting an aqueous ionic polyurethane dispersion;
   (b) selecting a stearate salt;
   (c) admixing, frothing, casting and curing said polyurethane dispersion and said stearate salt; and
   (d) co-curing the resultant polyurethane foam sheet with a layer of pressure sensitive adhesive to form a laminate.

8. The method according to claim 7 wherein step (a) further comprises the step of:
   (a) selecting an aqueous ionic polyurethane dispersion having a polyurethane solids content between 35 and 70 percent by weight.

9. The method according to claim 8 wherein step (b) further comprises the step of:
   (a) selecting a stearate salt from the group consisting of aluminum stearate, ammonium stearate, calcium stearate, potassium stearate and sodium stearate.

10. The method according to claim 8 wherein steps (b) and (c) further comprise the steps of:

(b) selecting a 33 percent by weight stearate salt dispersion containing a stearate salt selected from the group consisting of aluminum stearate, ammonium stearate, calcium stearate, potassium stearate and sodium stearate;

(c) admixing, frothing, casting and curing said polyurethane dispersion and stearate salt dispersion.

11. The method according to claim 10 wherein step (d) further comprises the step of:

(d) co-curing the resultant polyurethane foam sheet with a layer of acrylic pressure sensitive adhesive to form a laminate.

12. The method according to claim 11 wherein step (a) further comprises the step of:

(a) selecting an aqueous ionic polyurethane dispersion having a polyurethane solids content between 35 and 70 percent by weight, in an amount between 33 and 87 percent by weight.

13. The method according to claim 12, wherein steps (b) and (c) further comprise the steps of:

(b) selecting a 33 percent by weight stearate salt dispersion containing a stearate salt selected from the group consisting of aluminum stearate, ammonium stearate, calcium stearate, potassium stearate and a polyfunctional aziridine crosslinking agent;

(c) admixing, frothing, casting and curing said polyurethane dispersion, said stearate salt dispersion and said polyfunctional aziridine crosslinking agent.

14. The method according to claim 13, wherein step (b) further comprises the step of:

(b) selecting a 33 percent by weight stearate salt dispersion containing a stearate salt selected from the group consisting of aluminum stearate, ammonium stearate, calcium stearate, potassium stearate and sodium stearate, in an amount between 13 and 50 percent by weight and a polyfunctional aziridine crosslinking agent in an amount up to 33 percent by weight.

15. The method according to claim 13, wherein step (a) further comprises the step of:

(a) selecting an aqueous ionic polyurethane dispersion having a solids content between 35 and 70 percent by weight, in an amount between 83 and 85 percent by weight.

16. The method according to claim 14, wherein step (b) further comprises the step of:

(b) selecting a 33 percent by weight stearate salt dispersion containing a stearate salt selected from the group consisting of aluminium stearate, ammonium stearate, calcium stearate, potassium stearate and sodium stearate, in an amount between 12 and 14 percent by weight and a polyfunctional aziridine crosslinking agent in an amount up to 3 percent by weight.

17. Product produced in accordance with the method of claim 16.

* * * * *

UNITED STATES PATENT AND TRADEMARK OFFICE
CERTIFICATE OF CORRECTION

PATENT NO. : 4,675,232

DATED : June 23, 1987

INVENTOR(S) : Martin I. Edenbaum et al.

It is certified that error appears in the above-identified patent and that said Letters Patent is hereby corrected as shown below:

In the Abstract - Line 7 "casing" should read —casting—.

Column 2, Line 5 "a" (second occurrence) should read --at--

Column 2 Line 20 "plyurethane" should read —polyurethane—.

Column 4 Line 34 "polyster" should read —polyester—.

Column 4 Lines 58 & 59 "reacted" should read —reacting—.

Column 6 Line 54 "pressue" should read —pressure—.

Column 7 Line 10 "agenst" should read —agents—.

Column 7 Line 58 "Ohe" should read —One—.

Claim 9 - Column 8 Line 64 "(a)" should read —(b)—.

Signed and Sealed this

Fifth Day of January, 1988

Attest:

DONALD J. QUIGG

*Attesting Officer*      *Commissioner of Patents and Trademarks*